United States Patent Office 3,121,134
Patented Feb. 11, 1964

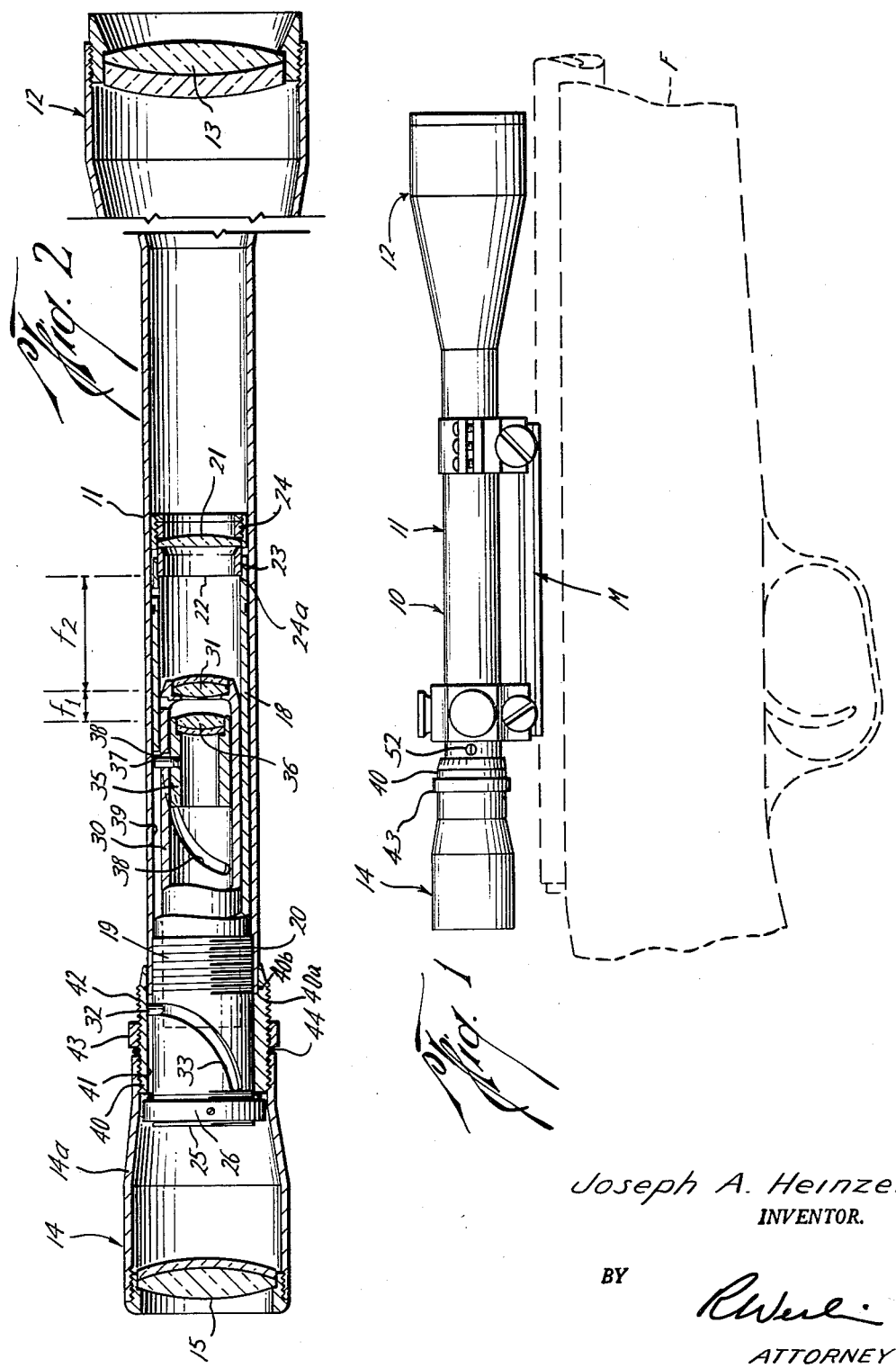

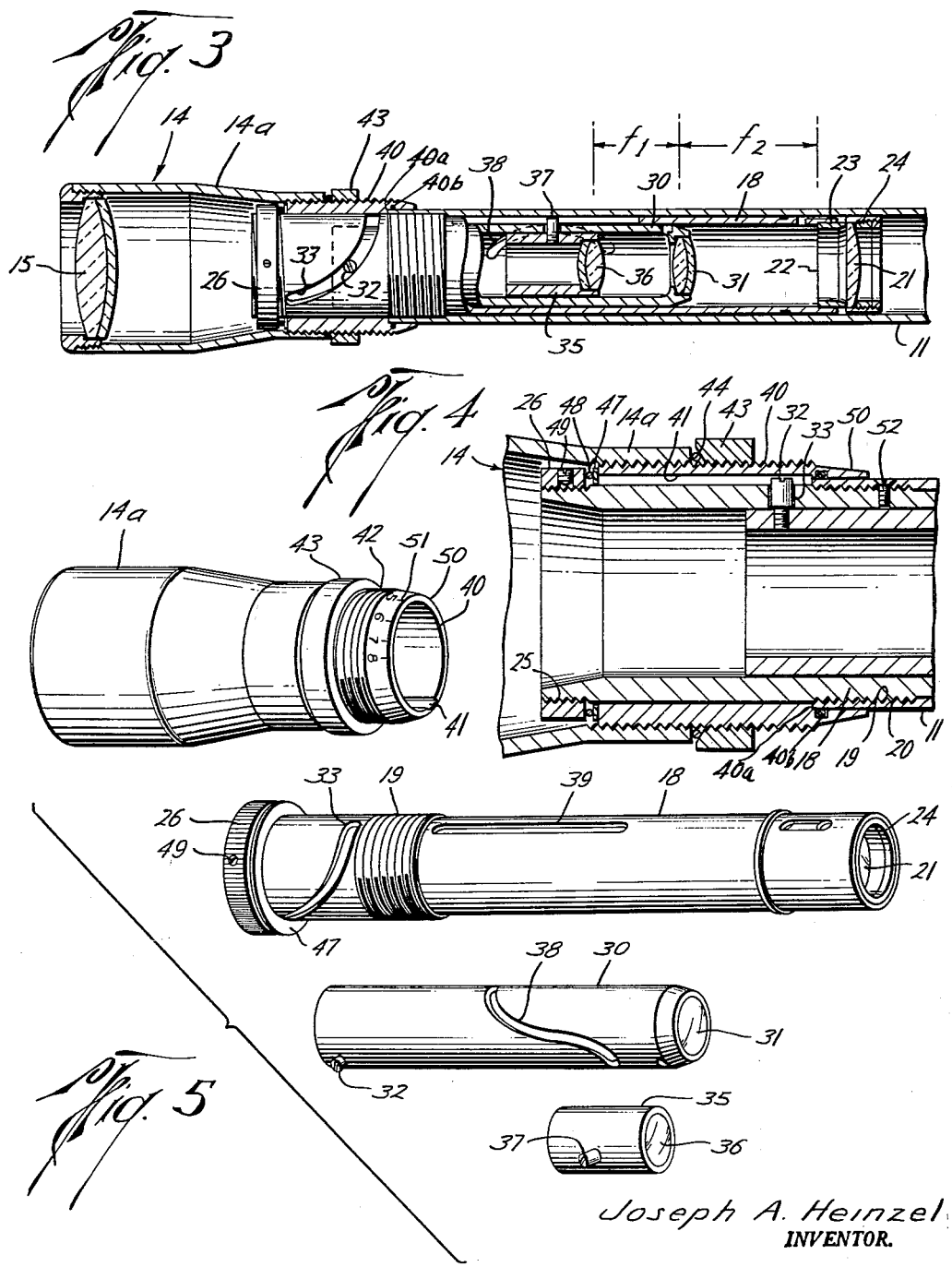

3,121,134
VARIABLE POWER TELESCOPE SIGHT
Joseph A. Heinzel, El Paso, Tex., assignor to
William R. Weaver, El Paso, Tex.
Filed Dec. 5, 1960, Ser. No. 73,780
1 Claim. (Cl. 88—32)

This invention relates to telescope sights for firearms, and more particularly to variable power telescope sights.

In variable power scopes, means are conventionally employed for adjusting the relative positions of the erector lens elements relative to a field lens and to each other in order to change the magnification of the telescope to increase or decrease its power, as may be desired, usually within limits as determined by the range of variation desired.

Since variable power scopes necessarily involve the employment of a number of moving parts in effecting the adjustments, one of the problems normally encountered is to provide means which will assure against the disturbance of the parts from their adjusted position by reason of handling, and particularly by reason of recoil of the firearm during use. Changes in the power of the scope frequently must be made in the field rapidly and with positiveness in obtaining a change which will maintain the scope in focus throughout the conditions of use.

It is a principal object of this invention to provide a variable power scope which is relatively simple in construction and which employs an improved means for assuring the maintenance of the scope in focus throughout its range of adjustment under field handling conditions, particularly under recoil of the firearm.

In variable power scopes the changes in the relative position of the erector lenses is normally accomplished by means of helical shaped slots in the erector mechanism and a rotatable actuating collar on the outside of the scope. The angularity of the slots, the weight of the erector lenses, and lens cells, under recoil of the rifle, cause the scope to change power unless a means of overcoming these forces is incorporated in the scope. Accordingly, it is a further and more specific object of this invention to provide an adjustable friction means between the rotatable parts by which these forces may be overcome. Furthermore, due to wear of movable parts a loss of the required friction will develop as the scope is used and a further means of adjustment will be required to restore the original friction. Without the adjustable friction new parts would have to be installed.

Additional objects and advantages of this invention will become more readily apparent from the following detailed description when read in conjunction with the accompanying drawing which illustrates a useful embodiment in accordance with the present invention.

In the drawing, FIG. 1 is an elevational view showing a variable power scope in accordance with this invention, mounted on the receiver of a firearm;

FIG. 2 is a longitudinal, largely sectional view of the variable power scope;

FIG. 3 is a longitudinal, largely sectional view of a portion of the scope illustrating different relative positions of the erector lenses than in FIG. 2;

FIG. 4 is an enlarged fragmentary view of a portion of the scope illustrating, in greater detail, the construction and arrangement of the friction applying elements; and FIG. 5 is an exploded view of the ocular portion of the scope and the related erector elements operable by adjustment of the ocular housing.

Referring to the drawing, a variable power scope, designated generally by the numeral 10, is shown mounted on the receiver portion of a firearm F. The scope is supported on a mounting M of any suitable and conventional form including means by which the scope may be adjusted for windage and elevation, as required. A mounting M for this purpose is illustrated and described in my copending application Serial No. 75,039, filed December 9, 1960, now Patent No. 3,040,433, issued June 26, 1962.

The scope proper comprises a tubular casing or barrel 11, an objective portion 12 at the forward end which houses the usual objective lens 13, and an eye piece or ocular portion 14 which houses an ocular lens 15 of conventional form.

A tubular erector housing 18 extends into the bore of barrel 11 from its rearward end and is provided with a section of external threads 19 spaced forwardly from its rearward end which are received in an internally threaded socket 20 provided in the rearward end of barrel 11. Erector housing 18 has mounted in its forward end a field or gathering lens 21, of conventional construction, and a sighting mark or reticle 22 which is secured to the rearward end of a spacer ring 23 which seats against a shoulder 24a in the bore of housing 18 and provides appropriate spacing between the reticle and the field lens, the reticle being located substantially at the first image plane of the scope. A locking ring 24 is threaded into the forward end of housing 18 to secure the field lens 21 and reticle 22 in position in the housing against shoulder 24a. At its rearward end spaced from threads 19, housing 18 is provided with a section of external threads 25 adapted to receive a friction ring 26, the function of which will be described more fully hereinafter.

Concentrically disposed in the bore of housing 18 is a tubular sleeve, which, for purposes of this description, may be termed the outer erector cell 30. Cell 30 has mounted in the forward end of its bore an erector lens 31. Adjacent the rearward end, outer cell 30 is provided with a radially projecting cam follower 32 which projects into a rearwardly extending curved cam slot 33 cut through the wall of erector housing 18 between thread sections 19 and 25. It will be seen with this arrangement that when cam follower 32 is caused to travel along cam slot 33, outer erector cell 30 will be caused to turn through an angle determined by the angular distance between the ends of cam slot 33 and to move longitudinally an amount proportional to the longitudinal distance cam follower 32 moves along slot 33. Thus, by moving cam follower 32 along cam slot 33, outer erector lens 31 will be moved longitudinally relative to reticle 22 and field lens 31 to vary the focal distance between lens 31 and reticle 22 ($F^2$) and thereby change the magnification of the image.

Mounted in the bore of outer erector cell 30 is a short sleeve which, for purposes of this disclosure, may be termed the inner erector cell 35. The latter has an erector lens 36 mounted in its forward end and is slidably disposed in the bore of outer erector cell 30, so as to vary the focal relationship ($F^1$) between the two erector lenses 31 and 36. A cam follower 37 extends radially from the wall of cell 35 through a curved cam slot 38 formed in the wall of outer erector cell 30. Cam follower 37 projects beyond the confines of cell 30 into a longitudinal slot 39 cut through the wall of erector housing 18. It will be evident that as outer erector cell 30 revolves it will cause inner erector cell 35 to move longitudinally in bore of outer cell 30 so as to correspondingly vary the position of inner erector lens 36 relative to outer erector lens 31. Cam follower 37 will travel in longitudinal slot 39 and therefore inner erector cell 35 will move in a straight line without rotative movement. Further, it will be seen that when cam follower 32 is caused to travel along cam slot 33 not only will the position of outer erector lens 31 change relative to reticle 22, but that inner erector lens 36 will move simultaneously relative to lens 31. The longitudinal movements of the two erector lenses relative to each other and to the reticle will be in accordance with the relative shapes of cam slots 33 and 38 which may be designed in accordance with well-known principles to produce the desired relative movements.

Rotation of the outer erector lens cell is effected by means of a power change collar 40 which is mounted on the rearward end portion of erector housing 18 and is provided in its inner surface with a longitudinal guide slot 41 into which the outer end of cam follower 32 projects. Collar 40 is provided with external threads 42 on to which is screwed the housing 14a of ocular portion 14. A lock ring 43 is screwed on collar 40 in front of ocular housing 14a and serves to lock the ocular housnig on collar 40. An O-ring seal 44 is positioned about collar 40 between the adjacent end surfaces of ocular housing 14a and lock ring 43. By means of the connection of ocular housing 14a to collar 40, it will be seen that rotation of the ocular housing will rotate collar 40. The latter, by reason of the engagement of cam follower 32 in slot 41, will drive the follower along cam slot 33, causing a partial rotation of outer cell 30 and limited longitudinal movement thereof, the longitudinal movement of follower 32 being accommodated by guide slot 41. The rearward end of power change collar 40 is spaced slightly from friction collar 26 to accommodate a metallic washer 47 and an annular body of a suitable friction-creating material such as a conventional resilient O-ring 48. Rotation of outer cell 30 will act through the engagement of cam follower 37 in cam slot 38 to simultaneously move inner cell 35 longitudinally with respect to outer cell 30 and thereby vary the position of erector lens 36 relative to erector lens 31. Rotation of collar 40 will thus cause both erector lenses to be moved simultaneously longitudinally relative to each other and to the reticle and in relative proportions determined by the relative shapes of the cam slots. Thus, ocular housing 14a, power change collar 40, the erector cell housings with the cam slots and their respective followers, comprise cooperable drive means by which the positions of the erector lenses relative to each other and to the reticle may be varied as desired to correspondingly vary the magnification of the sighted image. Collar 40 is provided with an internal shoulder 40a near its forward end which is adapted to abut the end of barrel 11 to limit forward movement of collar 40 on the barrel. An O-ring seal 40b is positioned in the bore of collar 40 forwardly of shoulder 40a to seal between collar 40 and barrel 11.

The degree of friction between the opposed surfaces of power change collar 40 and friction ring 26 may be varied by the degree to which friction ring 26 is adjusted on threads 25. A set screw 49 extends through friction ring 26 to lock the latter to threads 25 when adjustment of the friction ring is made to provide the desired degree of frictional pressure through O-ring 48 against the rearward end of power change collar 40, the forward movement of which is stopped by the engagement of shoulder 40a against the end of barrel 11. The forward end of power change collar 40 is formed to provide a smooth inwardly tapering surface 50 on which may be marked indicia 51 (FIG. 5) which may be employed to indicate the various power settings of the scope, these indicia being positioned to register with a gage mark formed by the kerf in the head of a set screw 52 (FIG. 1) which extends through barrel 11 and erector housing 18 to lock these elements together, set screw 52 having a flat head flush with the outer surface of barrel 11 and being turned so that the kerf in its head will be in alignment with the index marks on the power change collar. The parts will be so-positioned that when follower 32 is at one end of its travel along cam slot 33, the highest power index mark will be in registration with the kerf in the head of set screw 52, and when follower 32 is at the opposite end of its travel along cam slot 33 the lowest power index mark will be in registration with the kerf in the head of set screw 52. The intermediate index marks will indicate to the user the intermediate power settings of the scope. One common example of a variable power scope in accordance with this invention will vary the power from 4 magnifications to 8 magnifications, or as commonly stated from 4× to 8×. In addition to its indexing function, set screw 52 is employed to fixedly secure erector housing 18 in barrel 11 at the point at which the erector housing is inserted in barrel 11 to place field lens 21 and reticle 22 at the proper focus relative to the objective in order to eliminate parallax.

It will be seen that since the change in power of the scope is effected by rotating ocular housing 14a and power change collar 40 around the exterior of barrel 11 and about erector housing 18, it is important that no looseness or play should develop in these relatively moving parts so that when a particular power setting has been effected, the parts will remain in this setting despite rough handling or recoil of the firearm. Moreover, manufacturing tolerances in the dimensions of the several parts, although small, necessarily introduce variations in the frictional forces between the relatively movable parts, such, for example, as variations in the dimensions of barrel 11 in relation to the internal diameter of the bore of collar 40. Thus, small but significant variations in the friction of O-ring 40b may result which should be compensated for. The several parts may be held firmly in the desired relationships under all conditions by providing friction ring 26 which is adjustable on threads 25 to vary the pressure of O-ring 48 on the end of collar 40 to thereby vary the degree of friction to which the power change collar will be subjected. By applying an appropriate degree of friction, assurance is provided against the disturbance of the power setting, without unduly limiting the freedom of rotation of ocular housing 14a in effecting changes in the power of the scope. Friction ring 26, when adjusted, may then be locked in place by means of the set screw 49.

It will be understood that the various lenses referred to and illustrated may be simple or compound lenses, being constructed in accordance with well known principles to provide the desired optical characteristics.

Various changes and modifications may be made in the details of the illustrative embodiment within the scope of the appended claim but without departing from the spirit of this invention.

What I claim and desire to secure by Letters Patent is:

A variable power telescope sight, comprising, a tubular barrel having objective lens means mounted in the forward end thereof, a field lens and a sighting reticle fixedly mounted in the barrel essentially in the objective image plane, first and second erector lenses positioned in the barrel rearwardly of the reticle, concentric relatively slidable inner and outer sleeves separately supporting the respective erector lenses, cooperable drive means connecting the sleeves to each other and to the barrel arranged to move said erector lenses longitudinally of said barrel simultaneously relative to said reticle and to each other through distances proportioned to correspondingly vary the magnification of an image at said image plane, a collar member rotatably mounted on the rearward end portion of said barrel and forming a portion of said drive means, the forward end of said collar member defining an annular bearing surface frictionally engaging the barrel, an ocular element including an ocular housing secured to said collar member for rotation therewith, said drive means including a first cam slot in said barrel, a first cam follower mounted on said outer sleeve to extend through and drivingly engage said first cam slot, a first longitudinal guide slot in the collar member to drivingly receive said first cam follower, a second cam slot in said outer sleeve, a second cam follower mounted on the inner sleeve to extend through and drivingly engage said second cam slot, a second longitudinal guide slot in said barrel to drivingly receive said second cam follower, and adjustable friction means for varying the frictional forces between said collar member and said barrel, said adjustable friction means comprising a ring member threadedly mounted on the rearward end portion of said barrel for longitudinal movement relative to the rearward end of said collar member, and an annular body of friction-creating material positioned about said rearward end portion in compression between said rearward end of said collar member and said ring member.

References Cited in the file of this patent

UNITED STATES PATENTS

| | | |
|---|---|---|
| 702,048 | Common | June 10, 1902 |
| 2,053,231 | Taylor | Sept. 1, 1936 |
| 2,184,352 | Langsner | Dec. 26, 1939 |
| 2,538,846 | Reardon | Jan. 23, 1951 |
| 3,038,378 | Harris et al. | June 12, 1962 |

FOREIGN PATENTS

| | | |
|---|---|---|
| 22,766 | Great Britain | of 1914 |

OTHER REFERENCES

Hertel, German application 1,013,090, printed August 1, 1957 (K1 42 h 13/03) (1 sht. dwg., 3 pp. spec.).